(12) United States Patent
Higby et al.

(10) Patent No.: US 7,305,166 B1
(45) Date of Patent: Dec. 4, 2007

(54) GRADED REFRACTIVE INDEX OPTICAL FIBERS, OPTICAL COMPONENTS FABRICATED TO INCLUDE PLURAL GRADED INDEX OPTICAL FIBERS AND METHODS OF FABRICATING THE SAME

(75) Inventors: Paige Higby, Holland, MA (US); Michael Weisser, Sturbridge, MA (US)

(73) Assignee: Schott Corporation, Elmsford, NY (US)

( * ) Notice: Subject to any disclaimer, the term of this patent is extended or adjusted under 35 U.S.C. 154(b) by 60 days.

(21) Appl. No.: 10/846,015

(22) Filed: May 14, 2004

Related U.S. Application Data

(60) Provisional application No. 60/470,925, filed on May 15, 2003.

(51) Int. Cl.
    *G02B 6/028* (2006.01)

(52) U.S. Cl. .................... 385/124; 385/115

(58) Field of Classification Search .......... 65/415, 65/30.1, 30.13, 385; 385/124
    See application file for complete search history.

(56) References Cited

U.S. PATENT DOCUMENTS

| | | | |
|---|---|---|---|
| 3,830,640 A | * | 8/1974 | Kitano et al. ............. 65/30.1 |
| 3,963,468 A | | 6/1976 | Jaeger et al. |
| 4,372,767 A | * | 2/1983 | Maklad ..................... 65/412 |
| 4,578,096 A | | 3/1986 | Siegmund |
| 5,522,003 A | | 5/1996 | Ward et al. |
| 5,673,353 A | | 9/1997 | Ward et al. |
| 5,719,973 A | | 2/1998 | Monroe et al. |
| 5,881,195 A | | 3/1999 | Walker |
| 6,598,429 B1 | * | 7/2003 | Jiang et al. ............... 65/412 |
| 2002/0146202 A1 | | 10/2002 | Reed et al. |
| 2002/0150333 A1 | | 10/2002 | Reed et al. |

* cited by examiner

*Primary Examiner*—Sarah Song
(74) *Attorney, Agent, or Firm*—Louis J. Franco; Law Office of Louis J. Franco

(57) ABSTRACT

A graded-refractive-index optical fiber is fabricated by providing an elongated core rod of a first material including a concentration of high-refractive-index ions and a cladding tube of a second material including a lower concentration of the high-refractive-index ions present in the core rod material. The core rod is axially introduced into the cladding tube and the core rod and cladding tube are heated and vertically drawn in the furnace of a fiber drawing tower to cause the collapse of the cladding tube about the core rod and the radially outward diffusion of high-refractive-index ions into the cladding tube to yield an optical fiber exhibiting a radially graded refractive index that decreases with displacement from the rod axis. In various implementations, fused image-conducting fiber bundles are fabricated by bundling, heating and drawing a plurality of constituent-GRIN-optical-fiber pre-forms.

13 Claims, 13 Drawing Sheets

```
┌─────────────────────────────────────────────────────────────┐
│ A method of fabricating an optical fiber having a radially  │
│ graded refractive index profile, the method comprising:     │
│                                                       500   │
└─────────────────────────────────────────────────────────────┘
                    │                    │
                    ▼                    ▼
┌─────────────────────────────────────────────────────────────┐
│ providing an elongated glass preform core rod including a   │
│ uniform distribution of high refractive index ions;         │
│                                                       510   │
└─────────────────────────────────────────────────────────────┘
                              │
                              ▼
┌─────────────────────────────────────────────────────────────┐
│ providing an elongated glass preform cladding tube including│
│ one of (i) a zero and (ii) a relatively low concentration of│
│ the high refractive ions present in the core rod, the       │
│ cladding tube being adapted to axially receive the core rod │
│                                                       520   │
└─────────────────────────────────────────────────────────────┘
                              │
                              ▼
┌─────────────────────────────────────────────────────────────┐
│ introducing the core rod into the cladding tube to create a │
│ preform having a longitudinal preform axis passing through  │
│ the center of the core rod                                  │
│                                                       530   │
└─────────────────────────────────────────────────────────────┘
                              │
                              ▼
┌─────────────────────────────────────────────────────────────┐
│ orienting the preform such that the longitudinal preform    │
│ axis extends along a vertical axis                          │
│                                                       540   │
└─────────────────────────────────────────────────────────────┘
                              │
                              ▼
┌─────────────────────────────────────────────────────────────┐
│ introducing the preform into a furnace of an optical fiber  │
│ drawing tower; and                                          │
│                                                       550   │
└─────────────────────────────────────────────────────────────┘
                              │
                              ▼
┌─────────────────────────────────────────────────────────────┐
│ heating and drawing the preform along the vertically        │
│ oriented preform axis such that the tube collapses and fuses│
│ around the rod and such that a quantity of the high         │
│ refractive index ions in the core is permitted to diffuse   │
│ radially outwardly with respect to the preform axis         │
│ *(across the interface between the core and the cladding)*  │
│ and into the cladding.                                      │
│                                                       560   │
└─────────────────────────────────────────────────────────────┘
```

*FIG. 5*

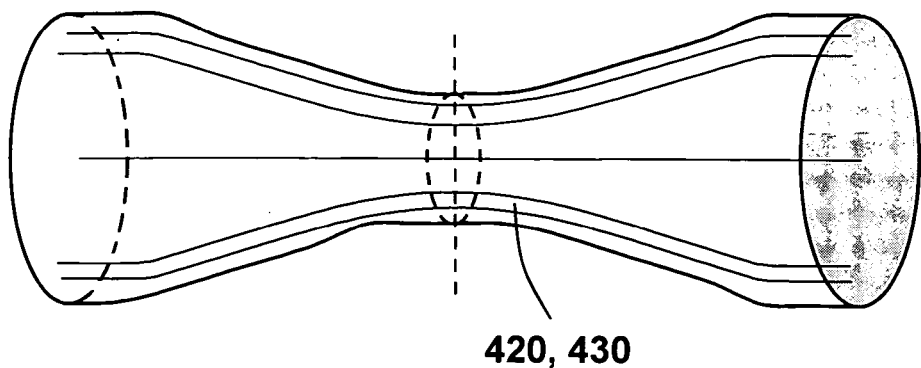
FIG. 6Ei
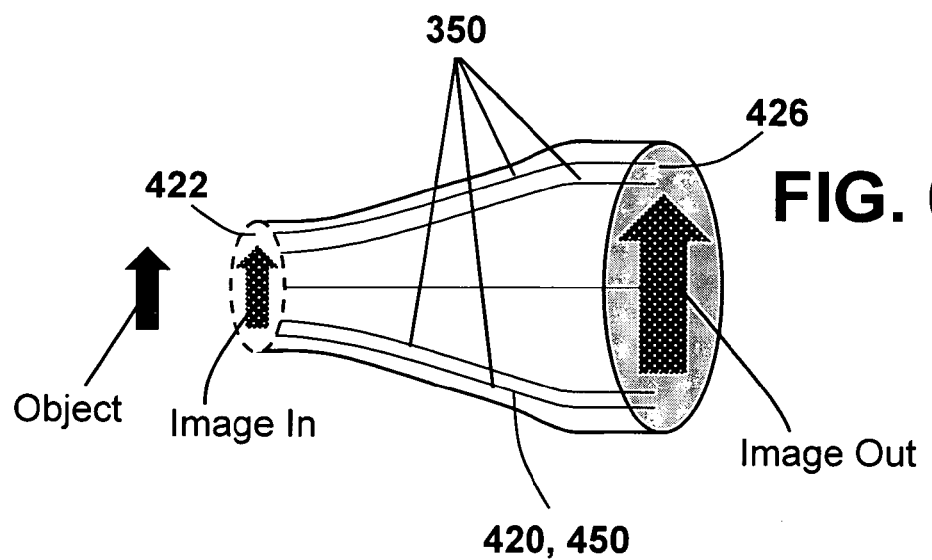
FIG. 6Eii
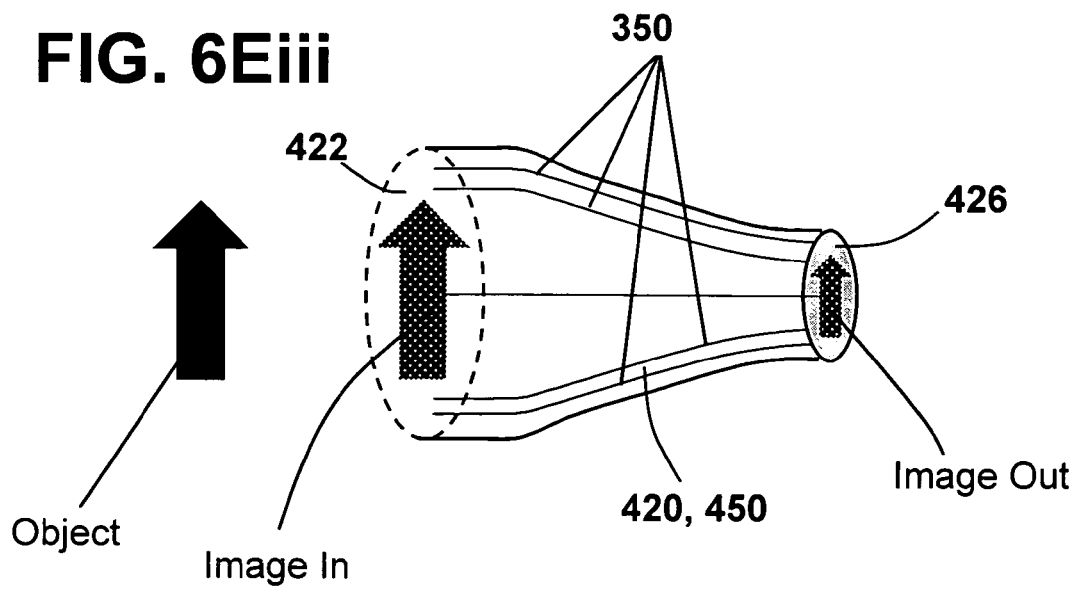
FIG. 6Eiii

FIG. 7

700 — A method of fabricating a fused optical fiber image conduit having an image input end, an image emergence end opposite the image input end and a plurality of constituent, adjacently fused optical fibers, each optical fiber having a first end coinciding with the image input end and a second end coinciding with the signal emergence end, wherein each optical fiber of a selected set of optical fibers among the plurality has a radially graded refractive index profile, the method comprising:

710 providing a plurality of optical fiber pre-forms selected from a first set of constituent-optical-fiber pre-forms each of which pre-forms is fabricated in accordance with a method including (i) 712 providing an elongated glass core rod comprising a first material including a concentration of high-refractive-index ions, (ii) 714 providing an elongated glass cladding tube fabricated from a second material including one of (a) a zero and (b) a relative low concentration of the high-refractive-index ions present in the core rod (iii) 716 axially introducing the core rod into the cladding tube and (iv) 718 heating and drawing the cladding tube and the core rod such that the cladding tube collapses about the core rod, but in a manner calculated to avoid the diffusion of high-refractive-index-ions within the core rod and from the core rod into the cladding tube

720 providing a plurality of optical fiber pre-forms selected from a second set of constituent-optical-fiber pre-forms each of which pre-forms is fabricated in accordance with a method including (i) 722 providing an elongated glass core rod comprising a first material including a concentration of high-refractive-index ions, (ii) 724 providing an elongated glass cladding tube fabricated from a second material including one of (a) a zero and (b) a relative low concentration of the high-refractive-index ions present in the core rod and (iii) 726 heating and drawing the cladding tube and the core rod such that the cladding tube collapses about the core rod and such that radially outward diffusion of high-refractive-index-ions within the core rod and from the core rod into the cladding tube is facilitated thereby yielding a constituent-optical-fiber pre-form exhibiting a radially-dependent graded refractive index

730 bundling the selected constituent-optical-fiber pre-forms such that each constituent-optical-fiber pre-form extends along a common pre-form bundle axis and is in contacting engagement with at least one other constituent-optical-fiber pre-form in the pre-form bundle;

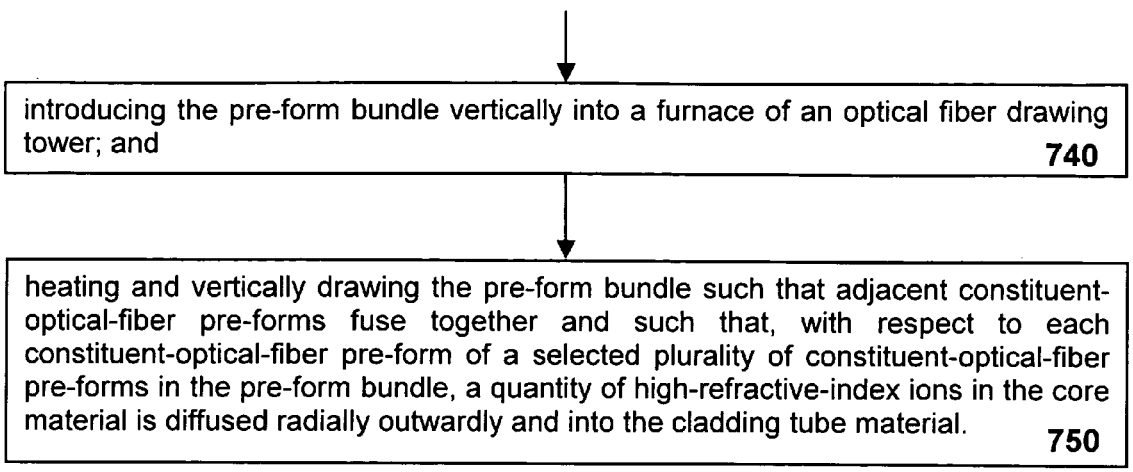
FIG. 7 Sheet 2 of 2

Constituent-optical-fiber preform 340 in which cladding tube 210 has been collapsed about core rod 110, but for which no intended diffusion of high-refractive-index ions HII has occurred.

GRADED REFRACTIVE INDEX OPTICAL FIBERS, OPTICAL COMPONENTS FABRICATED TO INCLUDE PLURAL GRADED INDEX OPTICAL FIBERS AND METHODS OF FABRICATING THE SAME

PROVISIONAL PRIORITY CLAIM

Priority based on Provisional Application Ser. No. 60/470,925, filed May 15, 2003, and entitled "GRADED REFRACTIVE INDEX OPTICAL FIBER ELEMENTS, OPTICAL COMPONENTS FABRICATED FROM PLURAL GRADED INDEX OPTICAL FIBER ELEMENTS AND METHODS OF FABRICATING THE SAME," is claimed.

BACKGROUND

1. Field

Embodiments and implementations of the present invention relate generally to optics and more particularly to the field of fiber optics.

2. Brief Description of an Illustrative Environment and Related Art

Individual optical fibers (i.e., monofibers) and image conduits comprising multiple adjacent and ordered optical fibers (i.e., image bundles, that are either fused or flexible) are used in many industries for the purpose of conducting images from a remote location to a location proximate to an observer's eye or other detector. As is known in the field, such image bundles can conduct images of objects (i) with which the distal end of the optical monofiber or image bundle is in direct contact or (ii) for which an image of the object is focused onto the distal end of the monofiber or image bundle by a traditional converging lens, for example. In the latter case, the image receiving end of the monofiber, or plural fiber ends within an image bundle, are positioned to correspond to the focal plane of the lens or lenses used to focus an image onto the fiber end(s).

Efforts have been undertaken to create what are known as GRIN lenses and optical fibers exhibiting characteristics of GRIN lenses. The basic premise of a GRIN lens is that the degree to which an incident ray of light is bent at the interface between a first material and a second material or medium (and, thus, the ability to focus light) is a function of (i) the shape or contour of at least one of the materials or media and (ii) the relative refractive index of the first material with respect to that of the second material. If each of the first and second materials is of a uniform refractive index, then a focusing optical element (i.e., a lens) can be made only by varying the thickness of the optical element (i.e., contouring). As a corollary to this first observation, if one has as an objective to create a lens from a flat material having opposed parallel sides (e.g., "faces") through which incident light rays are to pass, one can vary the index of refraction of the material from some maximum at the optical axis, for example, to some minimum, with the index of refraction decreasing in accordance with some non-linear function with radial displacement from the optical axis.

GRIN lenses are known and the general concept of a GRIN optical fiber is known. The known processes of forming GRIN optical fibers are, however, generally multi-staged and cumbersome. U.S. Pat. No. 5,673,353 represents a method of fabricating an optical fiber preform including, as stated in the abstract of the '353 patent, " . . . a central core of a first material, a surrounding tube of a second material, and a deeply placed bonded layer integrally formed between the core and the tube preferably by a heat driven interdiffusion of the first and second materials. The deeply placed interface layer of the resulting preform structure exhibits material characteristics related to the interdiffused material characteristics of the rod and tube materials. The interdiffusion is preferably performed while supporting the combined rod and tube structure. The preform is rotated during heating to maintain the geometric symmetry of the preform and the interface layer. An encapsulating carrier is used to support the preform in all dimensions during heating."

The specification of the '353 patent explains that an " . . . advantage of the present invention is that it efficiently provides a highly controllable deeply placed bonded radial interface layer within an optical preform providing for a smooth transition of one or more properties between two materials. The controlled properties may include . . . index of refraction . . . " The specification further emphasizes that, at least in most instances, and certainly the instances explained in any depth, the rotation of the preform during heating is about an axis orthogonal to any applied gravitational field. Although the representative processes disclosed in the '353 may be effective in achieving the stated objectives, they are undoubtedly cumbersome. Moreover, the processes of the '353 are apparently performed prior to the heating and drawing of any fiber.

Accordingly, there exists a need for a simplified method of fabricating a GRIN optical fiber in which the refractive-index-gradient profile is formed during the heating and vertical drawing of a core rod and a cladding tube, whether it be during the drawing of a single fiber or during the heating and drawing of a plurality of bundled fibers in order to fabricate a fused bundle comprising a plurality of GRIN optical fibers.

SUMMARY

In accordance with a typical implementation, a method of fabricating an optical fiber having a radially graded refractive index includes the steps of (1) providing an elongated glass core rod containing a concentration of high refractive index ions; (2) providing an elongated glass cladding tube containing one of (i) a zero and (ii) a relatively low concentration of the high refractive ions present in the core rod, the cladding tube being adapted to axially receive the core rod; (3) introducing the core rod axially into the cladding tube to create a preform having a longitudinal preform axis passing through the center of the core rod; (4) orienting the preform such that the longitudinal preform axis extends along a vertical axis; (5) introducing the preform into a furnace of an optical fiber drawing tower; and (6) heating and drawing, simultaneously, the preform along the vertically oriented preform axis such that, as a result of simultaneous heating and drawing, each of (i) the tube collapses and fuses around the rod and (ii) a quantity of the high refractive index ions originating in the core rod diffuses radially outwardly with respect to the preform axis and into the cladding material. It is to be understood that, in various alternative implementations, a first simultaneous heating and drawing step may be performed in order to collapse the tube about the core and that at least one subsequent step in which the core and cladding are simultaneously heated and drawn is undertaken in order to effectuate outward ion diffusion. It is also to be understood that, in various alternative implementations, a cladding tube containing one of (i) a zero and (ii) a relatively low concentration of the high refractive ions present in the core rod means, in either case, a cladding tube containing a much lower concentration of high-refractive-index ions than the concentration in the core rod. That is, while in many implementations, a cladding tube having a zero concentration of high-refractive-index ions is ideal, the practicality of achieving a zero concentration may be difficult at best. Accordingly, situations in which a zero concentration is ideal, but in which a zero concentration may be difficult to achieve, are envisioned as being within the scope of the language "a relatively low concentration of the high refractive ions present in the core rod." The concentration is "low" relative to the concentration in the core rod. An alternative, but equivalent way of stating the same desired condition is that, in various implementations, the concentration within the cladding tube of the high-refractive-index ions present in the core rod is as low as practicable. A large migration (e.g., diffusion) of high-refractive-index ions from the core rod into the cladding tube during heating and drawing is facilitated by rendering the concentrations of high-refractive-index ions in the core rod and the cladding tube as disparate as practicable in view of all parameters applicable to a specific implementation, including, for instance, the maximum desired refractive index at the axis of the core rod.

Implementations of the present invention facilitate the fabrication of a graded refractive index optical fiber in accordance with fiber drawing processes corresponding to the conventional rod-in-tube method used for creating traditional optical fibers characterized by a sharply defined change in refractive index between the core and the cladding. Various implementations of the present invention obviate the need for the fabrication of an intermediate preform in which, for example, a tube is collapsed about a core rod by heating and rolling about the core rod axis. In accordance with implementations of the present invention, the radius of the fiber resulting from the heating and drawing step is reduced relative to the outer diameter of the cladding tube in a manner analogous to the processes for extruding traditional optical fibers.

In various implementations, GRIN optical fibers may be drawn, bundled and then redrawn to fabricate flexible and fused optical components comprising plural GRIN optical fiber elements. Moreover, in some such implementations, the redrawing of each GRIN fiber as part of a component comprising multiple GRIN fibers enhances the gradient of each GRIN fiber of a selected set of GRIN fibers. That is, a predetermined gradient profile of a particular fiber within the bundle may not be achieved until the final draw in a multi-draw process.

In another set of implementations, multiple constituent-GRIN-fiber pre-forms in each of which, for example, the cladding tube is collapsed around or otherwise secured about a cladding rod are bound together and drawn through a furnace such that the individual fibers of the multi-fiber preform are not GRIN fibers, but emerge from the furnace as constituent GRIN fibers in a multi-GRIN-fiber component (e.g., a fused bundle).

In still additional implementations, the gradient of individual GRIN fibers included in a component containing multiple GRIN fibers is "tuned" subsequent to the final draw of the multi-GRIN-fiber optical components by, for example, the application of heat to the optical component.

It is to be understood that any of the aforementioned drawing and heating, or post-draw heating, procedures can be performed on fewer than all of a fiber bundle. For instance, in various implementations, only one end of the fiber bundle is heat treated to introduce or enhance the gradients of fibers at the heated end.

The application of GRIN fibers, and the potential applications of multi-GRIN-fiber components are numerous. One particular application for an array of fused GRIN fibers is digital projection. More specifically, in various assemblies, a plurality of GRIN fibers arranged in an array combine to form an optical element with the purpose of light beam conditioning in digital projection systems.

Representative embodiments are more completely described and depicted in the following detailed description and the accompanying drawings.

BRIEF DESCRIPTION OF THE DRAWINGS

FIG. 5 indicates method steps included in an illustrative method of fabricating a graded refractive index optical fiber;

FIGS. 6A through 6F depict illustrative components fabricated to include plural, adjacently-fused GRIN optical fibers;

FIG. 7 sets forth illustrative method steps executed in the fabrication of a basic fused GRIN-fiber image bundle used in the fabrication of more refined fused GRIN-fiber image bundles;

DETAILED DESCRIPTION

The following description of methods of fabricating an optical fiber having a radially graded refractive index (a GRIN monofiber), and of optical components comprising plural GRIN monofibers, is demonstrative in nature and is not intended to limit the invention or its application of uses. The various implementations, aspects, versions and embodiments described in the summary and detailed description are in the nature of non-limiting examples falling within the scope of the appended claims and do not serve to define the maximum scope of the claims.

FIGS. 1 through 4 depict illustrative components used in the fabrication of a GRIN optical fiber and characteristics of an illustrative GRIN optical fiber fabricated in accordance with an implementation of the invention. In conjunction with FIGS. 1 through 4, an illustrative method of fabricating a GRIN optical fiber is described below and depicted in FIG. 5. More specifically, FIG. 5 depicts illustrative method steps associated with a method of fabricating a GRIN optical fiber and FIGS. 1 through 4 depict physical apparatus and schematic and graphical representations of physical properties associated with the method of FIG. 5

Figure 1:
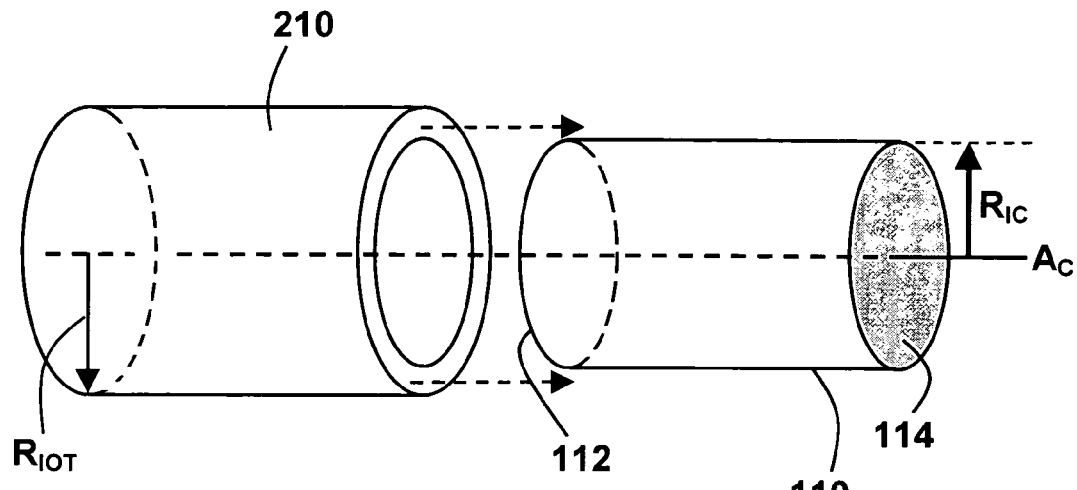
FIG. 1 shows a core rod containing a distribution of high refractive index ions being introduced into a cladding tube to create a preform.

Referring to FIGS. 1 and 5, in accordance with step 510, an elongated glass core rod 110 extending along a core axis $A_C$ and having first and second longitudinally opposed ends 112 and 114 is provided. In the illustrative embodiment of FIG. 1, the core rod 110 is cylindrical and characterized by an initial core radius $R_{IC}$, although the method described and claimed is not limited to any particular cross section of the core rod 110. The core rod 110 includes a distribution of high refractive index ions HII (e.g., lead, tantalum, tungsten and/or Niobium ions). Moreover, in a typical implementation, the distribution of ions HII is uniform, or at least not intentionally graded, throughout the core rod 110. As is known in the art, there are various extant methods of infusing optical materials with ions for the purposes of altering (i.e., typically increasing) the refractive index of the optical material either uniformly or variously. A common method of ion infusion involves the submersion of the optical material in a salt bath, for example.

A glass cladding tube 210 is provided at step 520. In various implementations, the method calls for a cladding tube 210 having either a relatively low concentration of the high refractive ions HII present in the core rod 110 or none of the high refractive ions HII (i.e., a zero concentration or density thereof). As explained in the summary, various implementations are, as a matter of practical limitation, facilitated by a cladding tube 210 being as free of the high-refractive-index ions HII as practicable. In fact, in a typical implementation, the fabrication process yields a gradient over a range between the maximum and minimum refractive indices that is proportionate to the disparity in the density of the high refractive ions HII between the core rod 110 and the cladding tube 210 from which the preform 300 is assembled. That is, the larger the disparity in the density of the high refractive ions HII in the core rod 110 and the cladding tube 210 of the initial preform 300, the larger the difference between the maximum and minimum indices of refraction between which the gradient profile extends in the resulting GRIN fiber 350. It will also be appreciated that, just as the distribution of ions HII throughout the core rod 110 may be, and is typically, uniform, or at least not intentionally graded, the distribution of ions HII in the cladding tube 210 is also typically uniform (i.e., not intentionally graded and as uniform as practicable). The case illustrated in FIG. 1A in which the cladding tube 210 starts with a zero concentration of high refractive ions HII is one example of a cladding tube 210 with a uniform distribution of high refractive ions HII.

Figure 1A:
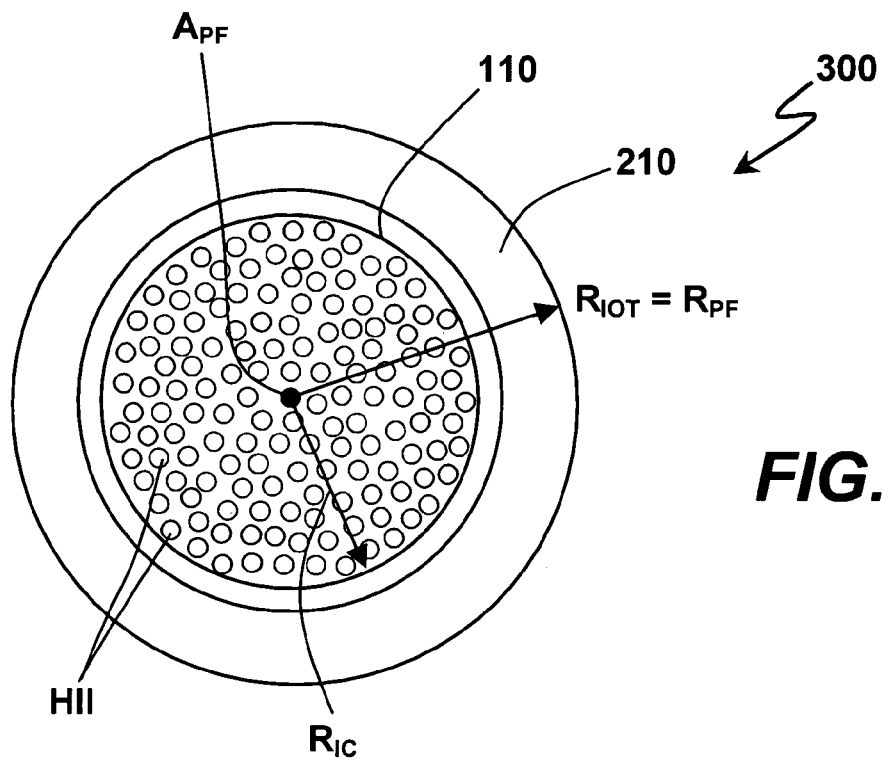
FIG. 1A is an end view of the preform depicting high refractive index ions in the core rod.

At step 530, the core rod 110 is axially introduced into the cladding tube 210 to create a preform 300 having a longitudinally extending preform axis $A_{PF}$ passing through the center of the core rod 110 and a preform radius $R_{PF}$ corresponding to the initial outside radius $R_{IOT}$ of the cladding tube 210, as shown in FIG. 1A.

Figure 2:
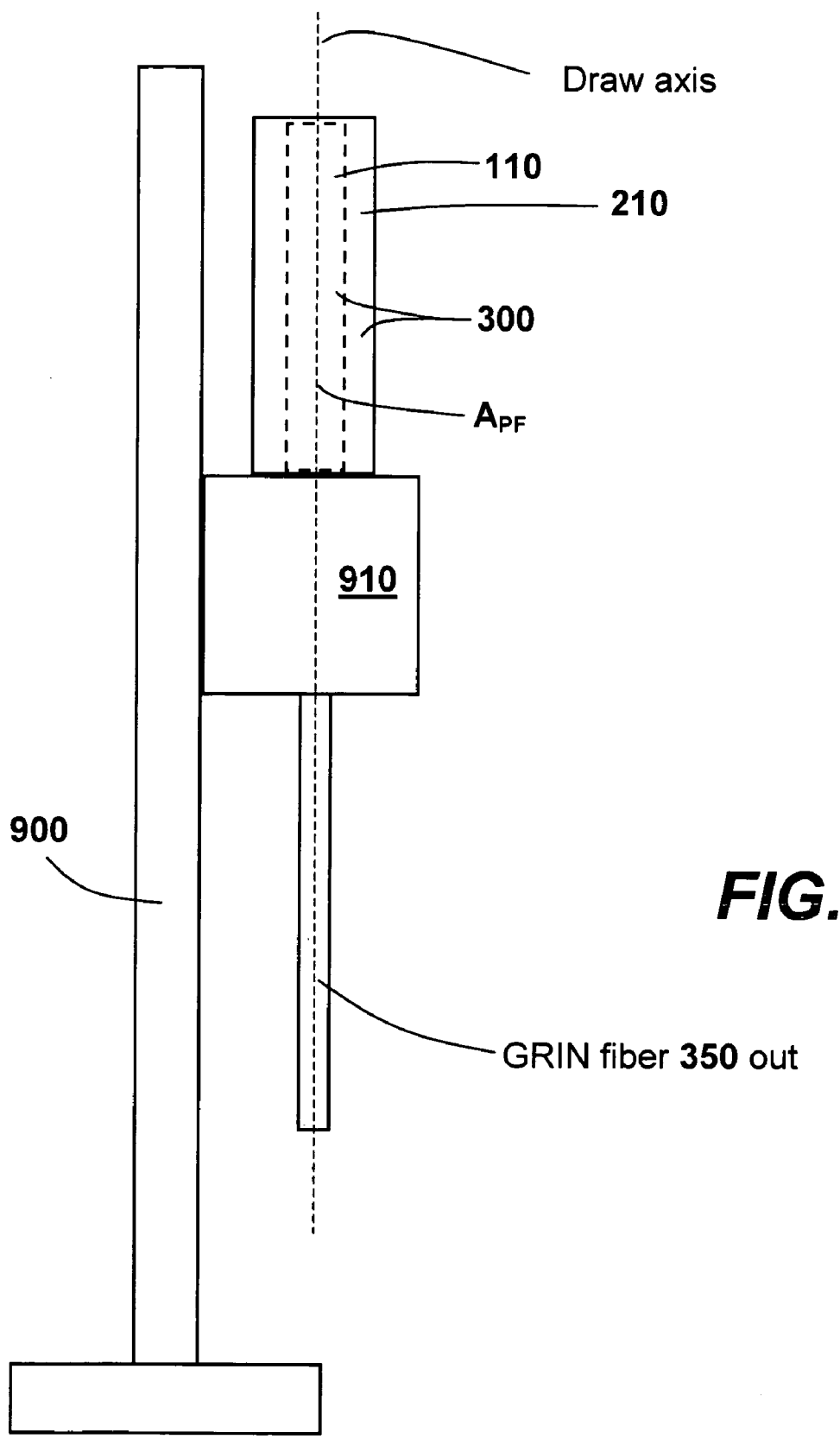
FIG. 2 is a schematic representation of a GRIN fiber preform being introduced into the furnace of a fiber drawing tower and the resulting GRIN fiber emerging below the furnace.

The preform 300 is oriented such that the longitudinal preform axis $A_{PF}$ extends along a vertical draw axis at step 540 and, at step 550, the preform 300 is introduced into a furnace 910 of, for example, an optical fiber drawing tower 900, as shown in FIG. 2. In accordance with step 560, the preform 300 is heated and drawn, simultaneously, along the preform axis $A_{PF}$ such that, as a result of the simultaneous heating and drawing, each of (i) the tube 210 collapses and fuses around the core rod 110 and (ii) a quantity of the high refractive index ions HII in the core 110 is permitted to diffuse radially outwardly with respect to the preform axis $A_{PF}$.

Figure 3:
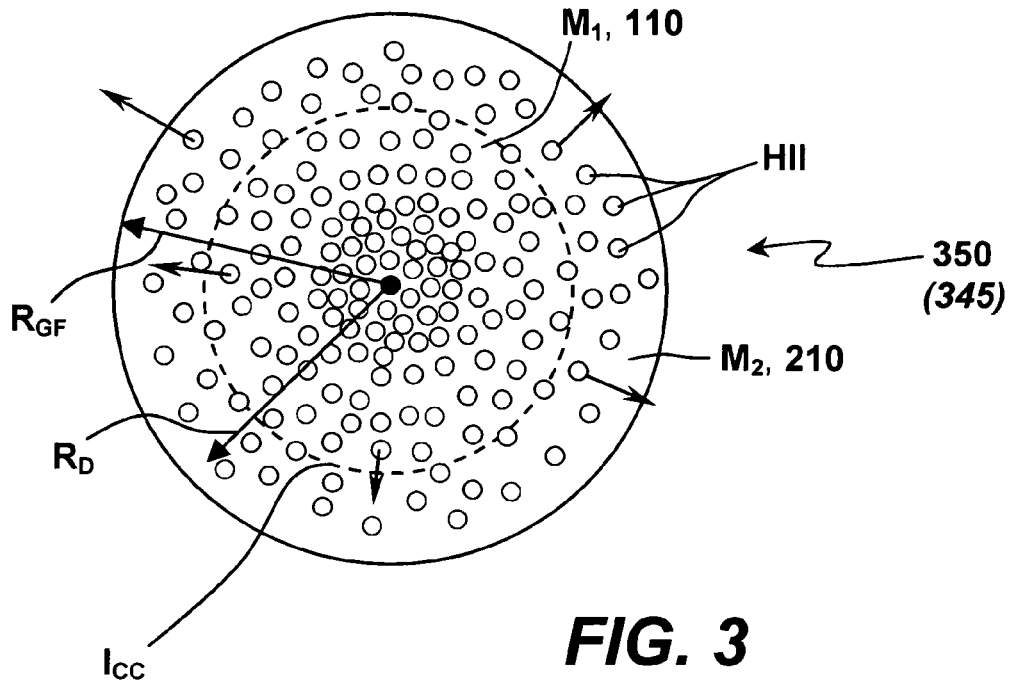
FIG. 3 is an end view of a GRIN fiber resulting form heating and drawing steps and indicating radial ion diffusion.
Figure 4:
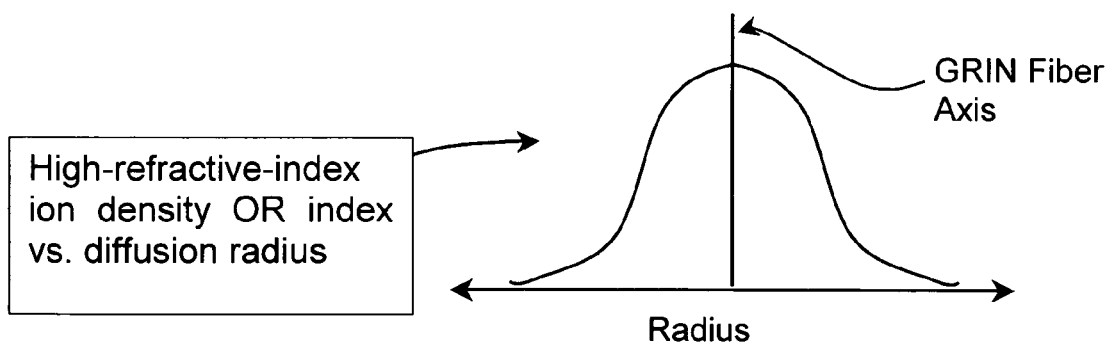
FIG. 4 is an illustrative graphical representation of ion density (or refractive index) as a function of radial diffusion within a GRIN fiber.

Referring to FIG. 3, as the preform 300 is simultaneously heated and drawn, the high refractive index ions HII diffuse across the interface $I_{CC}$ between the core rod 110 and the cladding tube 210 collapsed thereover. The rate of diffusion through the core rod 110 and the tube 210, and across the interface $I_{CC}$ therebetween, is dependent on factors such as the first material M1 from which the core 110 is made, the second material M2 from which the cladding tube 210 is made, temperature, draw rate and the size and mass of the ions used as high refractive index ions HII. These parameters are pre-selected in a manner calculated to achieve a predetermined radial high-refractive-index-ion profile in the graded refractive index fiber 350 (i.e., GRIN fiber) resulting from the heating and drawing step 560. The profile is typically such that the highest ion density, and therefore, the highest refractive index corresponds to the axis of the GRIN fiber 350 with the ion density falling off inversely with radius. More specifically, the ion density typically decreases in accordance with a smooth, nonlinear radially dependent function such as, by way of non-limiting example, $1/r^2$ or a parabolic function. FIG. 4 is an illustrative graphical representation of ion density (or refractive index) as a function of radial diffusion.

It will be appreciated that, were diffusion permitted to occur indefinitely, eventually the high refractive index ions HII originating in the core 110 would be evenly distributed throughout a product resulting from the heating and drawing of the core 110 and the cladding tube 210. It will furthermore be appreciated that such a resultant product would typically not be a GRIN fiber 350. Accordingly, the heating and drawing portions of the process 500 are terminated for a given unit length of preform 300 before a uniform ion distribution is attained. Moreover, in a typical implementation, the heating time, temperature and draw rate are controlled with the objective of allowing extruded portions of GRIN fiber 350 to cool before the diffusion radius $R_D$ is equal to the GRIN fiber radius $R_{GF}$, as shown in FIG. 3. That is, various implementations include as an objective preventing high refractive index ions HII diffusing into the drawn cladding tube 210 from migrating to the outer boundary of the drawn cladding 210 such that the high-refractive-index-ion density as a function of radius falls to zero before the diffusion radius $R_D$ is equal to the drawn-cladding radius $R_{DC}$.

Optical Components Including Plural Constituent GRIN Optical Fibers

Figure 6A:
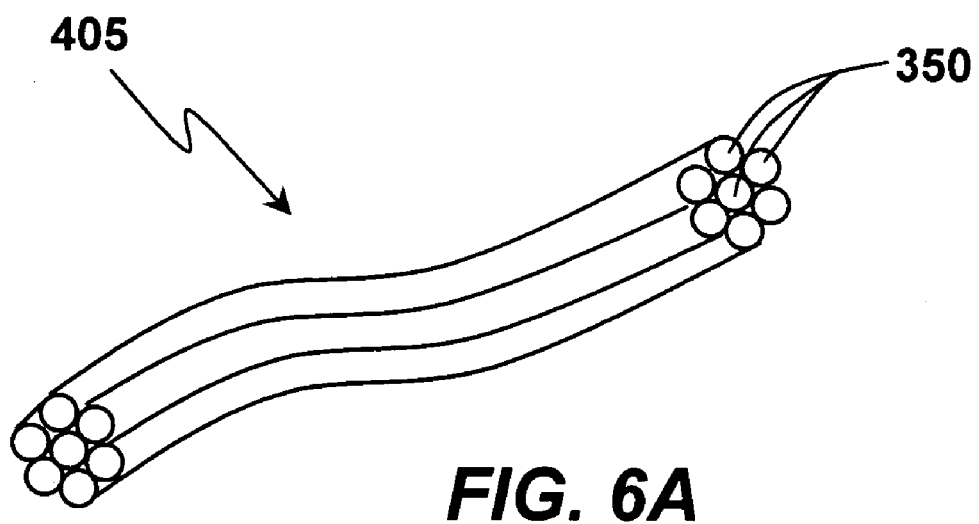
Figure 6B:
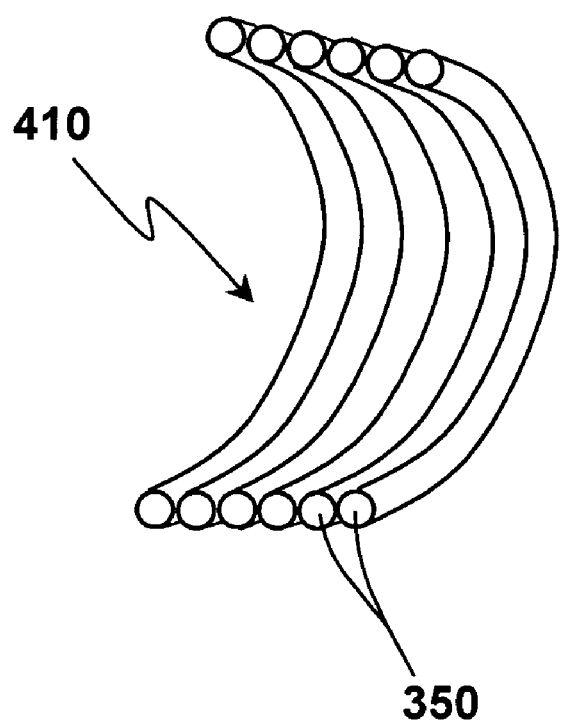

Various alternative optical components can be fabricated to include plural constituent GRIN fibers 350 fabricated in accordance with the previously described methods. Some flexible components may involve simply the bundling or-winding and cutting of or one or more GRIN fibers 350 to create flexible optical fiber bundles or ribbons such at the flexible image bundle 405 shown in FIG. 6A and the flexible ribbon 410 shown in FIG. 6B, for example. Alternatively, fused components such as fused 1-to-1 bundles, reducing/enlarging tapers, inverters and image-conducting faceplates can be fabricated using methods in most respects analogous to methods used in fabricating such components using traditional (i.e., not GRIN) optical fibers. In one illustrative method of fabricating fused components including plural constituent GRIN fibers 350, constituent-optical-fiber pre-forms are bundled, heated and drawn in order to fuse adjacent fiber pre-forms and cause selected fiber pre-forms within the bundle to exhibit GRIN characteristics by radially diffusing a quantity of high-refractive-index ions HII within in each of the selected fiber pre-forms. In another alternative illustrative method, plural GRIN fibers 350 serving as constituent-optical-fiber pre-forms are bundle, heated and drawn to fuse adjacent GRIN fibers 350 into a unitary structure and to enhance the GRIN characteristics through additional radial diffusion of high-refractive-index ions HII. Still additional versions incorporate in the same bundle constituent GRIN fibers 350 fabricated by both processes; that is, the bundling of GRIN fibers 350 and constituent-optical-fiber pre-forms that exhibit GRIN characteristics only after the bundle is heated and drawn.

Referring to FIGS. 6C through 6F, there are depicted various illustrative fused-bundle optical components fabricated to include plural constituent GRIN fibers 350. A feature common to these fused-bundle components is that, because they are comprised of GRIN optical fibers 350, they need not either (i) be in physical contact with an object an image of which they conduct or (ii) have an image of an object focused onto a receiving end thereof by a separate optical element such as a lens. Another common feature is that each may be fabricated from a basic fused bundle fabricated to include plural GRIN fibers 350. Subsequently, all or a portion of the fused bundle is then further processed in order to create a particular component in manners analogous to those familiar with the basics of traditional fused-optical-fiber component fabrication. A brief description of each of the components of FIGS. 6C through 6F is now provided.

Figure 6C:
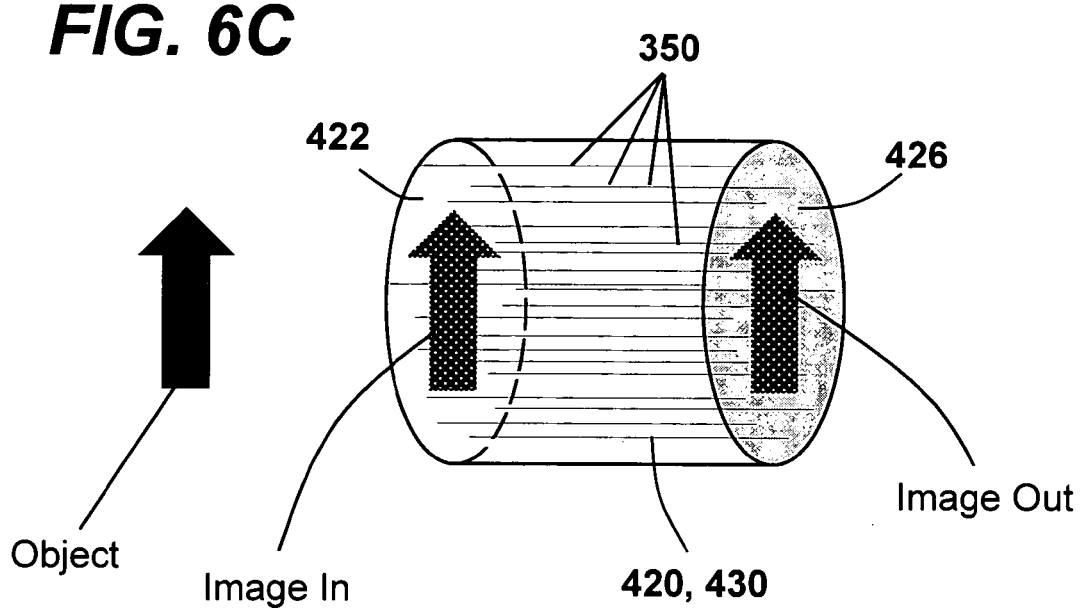

Shown in FIG. 6C is an elongated, basic fused GRIN-fiber bundle 420 including an image input end 422, and image emergence end 426 opposite the image input end 422 and a plurality of constituent GRIN optical fibers 350 extending between the image input and emergence ends 422 and 426. The particular fused GRIN-fiber bundle 420 of FIG. 6C corresponds to a device alternatively referred to in the relevant art as a "1-to-1 linear array" and a "straight-through." The GRIN straight-through 430 is, in various implementations, the fused image conduit formed as the basis for other, further processed components such as the illustrative fused GRIN-fiber bundles 420 of FIGS. 6D through 6F. As is the case with a conventional straight-through, the image-conducting GRIN straight-through 430 of FIG. 6C simply conducts the image of an object from the image input end 422 to the image emergence end 426 without any intended image alternation.

Figure 6D:
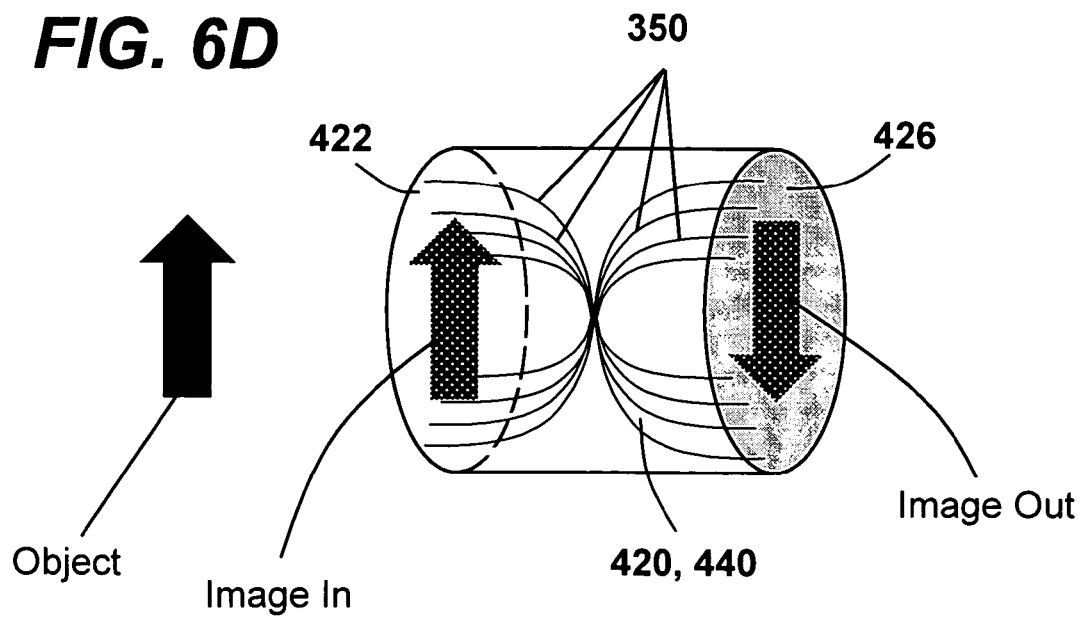

The fused image conduit (i.e., fused GRIN-fiber bundle 420) of FIG. 6D is a special case of a fused GRIN-fiber bundle 420 known as an inverter 440 that changes the angular orientation of an input image. As shown, and as the name suggests, an image of an object enters the GRIN inverter 440 at the image input end 422 and emerges from the image emergence end 426 inverted relative to the orientation of the input image. In a set of process steps analogous to those executed in the formation of a conventional image inverter, which are known to those of ordinary skill in the art, a GRIN image inverter 440, in various implementations, is formed by heating, softening and twisting a GRIN straight-through 430.

Shown in FIG. 6Ei is a GRIN straight-through 430 that has been heated and stretched in steps intermediate to the formation of the GRIN enlarger/reducer 450 shown in FIGS. 6Eii and 6Eiii. Existing knowledge among those of ordinary skill in the relevant art as to the fabrication of a conventional enlarger/reducer is sufficient to enable analogous processes for the formation of the GRIN enlarger/reducer 450. In FIG. 6Eii, the GRIN enlarger/reducer 450 is shown in use as an enlarger while, in FIG. 6Eiii, the GRIN enlarger/reducer 450 is shown in use as a reducer. It will be readily appreciated that the ends of the GRIN enlarger/reducer 450 serving as image input and image emergence ends 422 and 426 are reversed for alternative use of the GRIN enlarger/reducer 450 as an enlarger and a reducer.

Figure 6F:
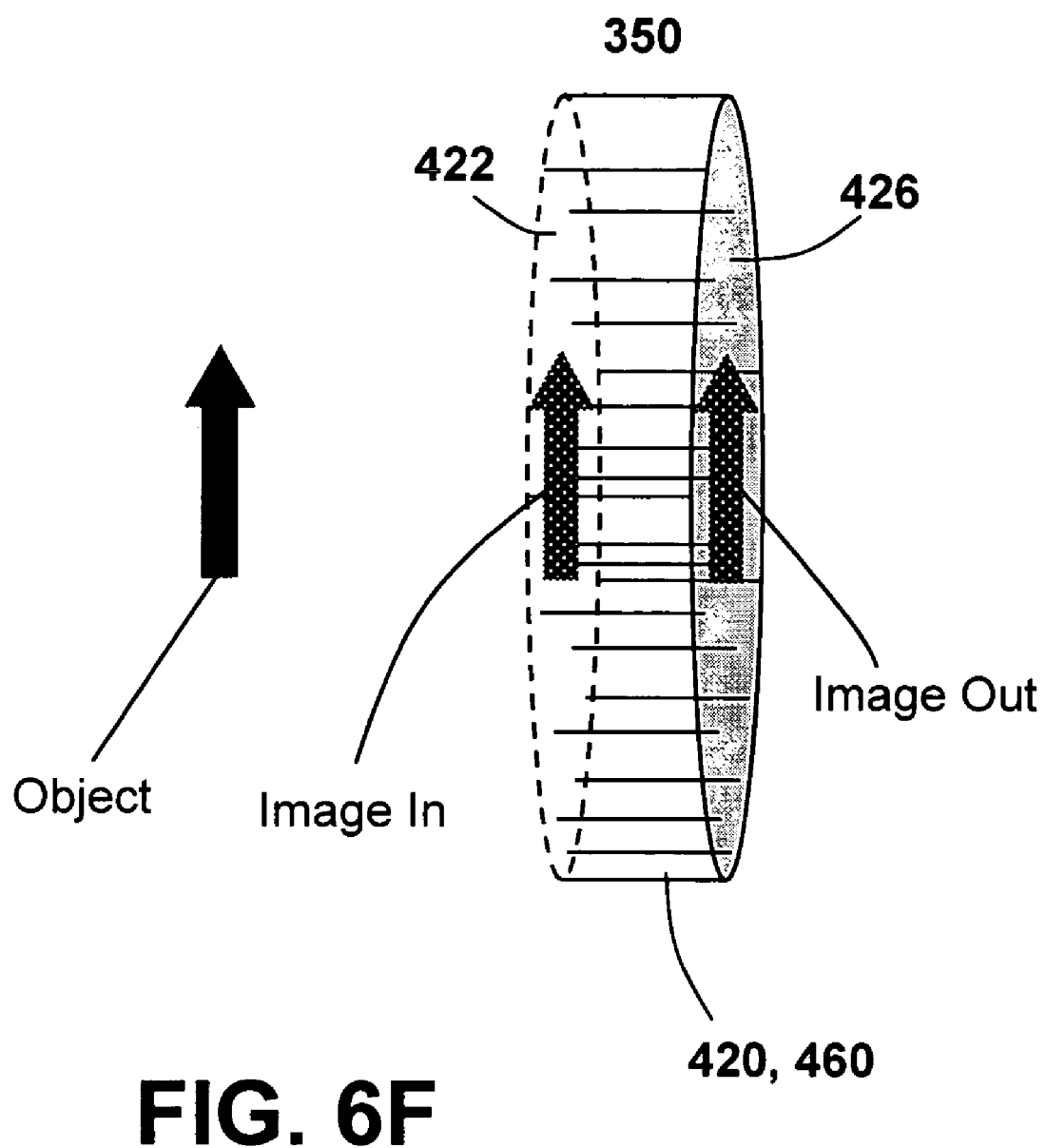

Depicted in FIG. 6F is an illustrative GRIN faceplate 460 that, as will be appreciated, is analogous in manufacture to a conventional image-conducting optical fiber faceplate. In a typical fabrication process, plural GRIN-faceplates 460 are fabricated by slicing an elongated GRIN straight-through 430, such as the illustrative GRIN straight-through 430 of FIG. 6C, to form relatively short (i.e., thin) plates. The image input and emergence faces 422 and 426 of each GRIN faceplate 460 are then ground and polished in steps analogous to those implemented in the manufacture of conventional optical fiber faceplates.

The various fused GRIN-fiber image conduits of FIGS. 6C through 6F are illustrative and non-limiting in nature; alternative components incorporating fused constituent GRIN fibers 350 are within the scope and contemplation of the invention. Some alternative components not explicitly illustrated may include features of two or more of the illustrated components. For instance, an inverting enlarger/reducer is considered to be within the scope and contemplation of the invention and support for such a component is found in the combined teachings of FIGS. 6D and 6Ei through 6Eiii and the textual descriptions associated with these drawings. That a basic fused GRIN-fiber bundle 420, such as that shown in FIG. 6C, is the foundation of a variety of "more refined" fused GRIN-fiber components warrants description as to methods of fabricating such a basic fused GRIN-fiber bundle 420.

Depicted in FIG. 7 are illustrative method steps for the fabrication of a fused, image-conducting GRIN-fiber bundle 420 having, as shown in FIG. 6C, an image input end 422, an image emergence end 426 and a plurality of constituent GRIN optical fibers 350, each optical fiber having a first end 352 coinciding with the image input end 422 and a second end 356 coinciding with the image emergence end 426, wherein each GRIN optical fiber 350 of selected set of GRIN optical fibers 350 among the plurality has a radially-dependent graded refractive index profile. Comprehension of the illustrative method shown in FIG. 7 is facilitated through reference to various figures depicting corresponding components and apparatus and referenced as indicated.

Figure 8A:
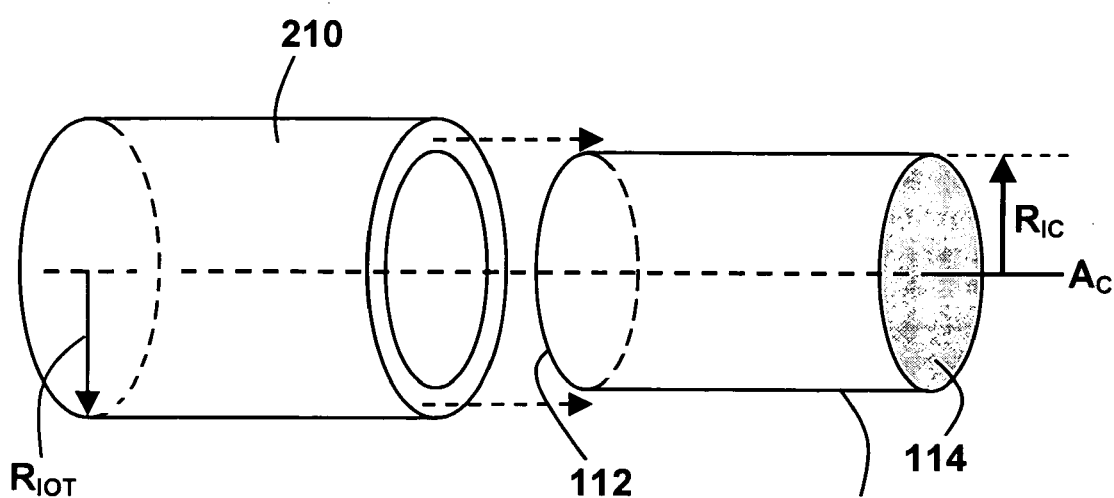
FIG. 8A shows a core rod containing a distribution of high refractive index ions being introduced into a cladding tube to create a preform.
Figure 8B:
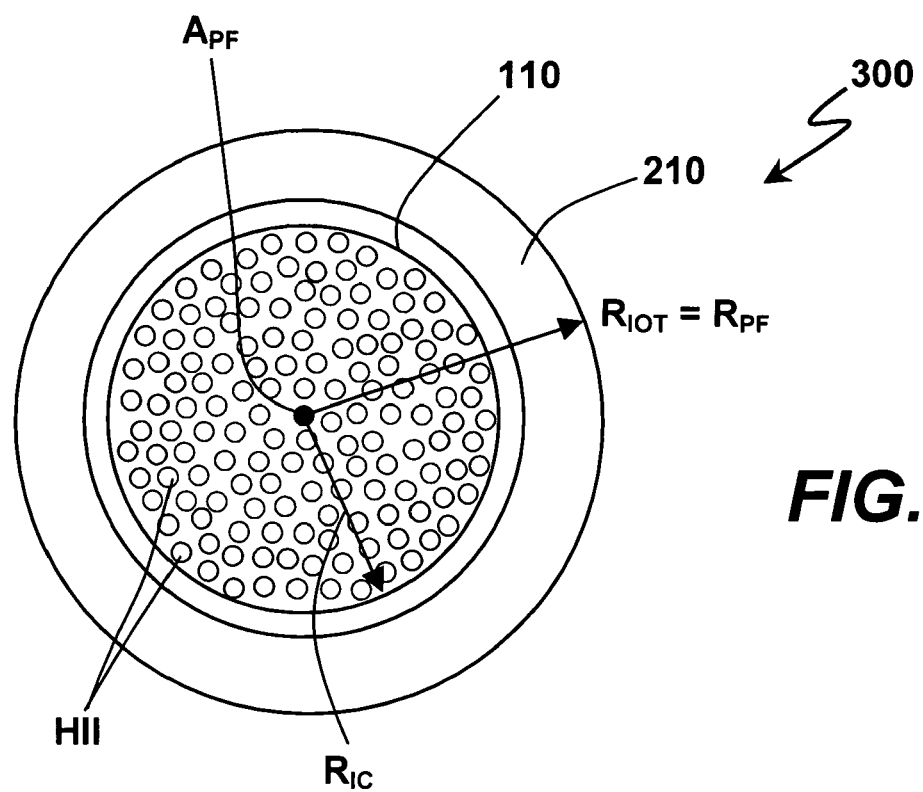
FIG. 8B is an end view of the preform depicting high refractive index ions in the core rod.
Figure 8C:
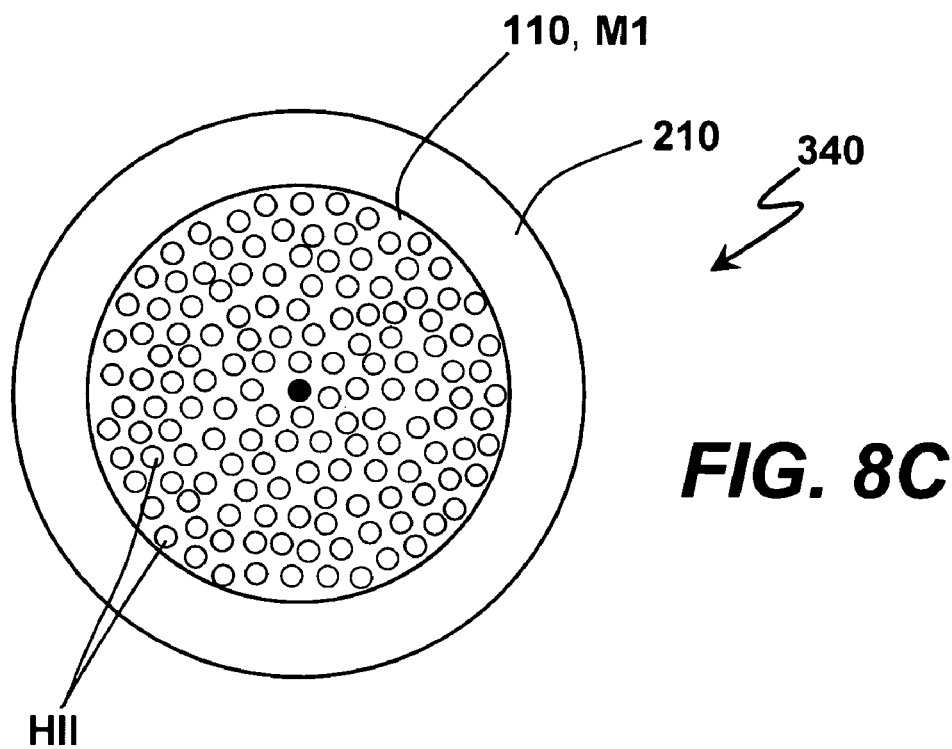
FIG. 8C is an end view of a constituent-GRIN-fiber pre-from resulting form heating and drawing steps and indicating no radial high-refractive-index-ion diffusion.

Referring now to FIG. 7 and FIGS. 8A through 8C, one of steps 710 and 720 is optionally performed exclusively of the other in some implementations and, in other implementations, both of steps 710 and 720 are performed. In step 710, a first set of constituent-optical-fiber pre-forms 340 is provided. Referring to FIGS. 8A, 8B and 8C, each constituent-optical-fiber pre-form 340 of the first set is fabricated in accordance with a method including the steps of (i) 712 providing an elongated glass core rod 110 comprising a first material $M_1$ including a concentration of high-refractive-index ions HII, (ii) 714 providing an elongated glass cladding tube 210 fabricated from a second material $M_2$ including one of (a) a zero and (b) a relative low concentration of the high-refractive-index ions HII present in the core rod 110 (iii) 716 axially introducing the core rod 110 into the cladding tube 210 and (iv) 718 heating and drawing the cladding tube 210 and the core rod 110 such that the cladding tube 210 collapses about the core rod 110 in a manner calculated to obviate the diffusion of high-refractive-index-ions HII within the core rod 110 and from the core rod 110 into the cladding tube 210, as shown in FIG. 8C.

A second set of constituent-optical-fiber pre-forms 345 is provided in accordance with step 720. For reasons that will more completely manifest themselves further in this paragraph, reference is made to FIGS. 1 through 3, in conjunction with FIG. 7, for the discussion relative to the fabrication of constituent-optical-fiber pre-forms 345 of the second set. Each constituent-optical-fiber pre-form 345 of the second set is fabricated in accordance with a method including the steps of (i) 722 providing an elongated glass core rod 110 comprising a first material $M_1$ including a concentration of high-refractive-index ions HII, (ii) 724 providing an elongated glass cladding tube 210 fabricated from a second material $M_2$ including one of (a) a zero and (b) a relative low concentration of the high-refractive-index ions HII present in the core rod 110 and (iii) 726 heating and drawing the cladding tube 210 and the core rod 110 such that the cladding tube 210 collapses about the core rod 110 and such that radially outward diffusion of high-refractive-index-ions HII within the core rod 110 and from the core rod 110 into the cladding tube 210 is facilitated thereby yielding a constituent-optical-fiber pre-form 345 exhibiting a radially-dependent graded refractive index. In other words, in various implementations, plural GRIN fibers 350 fabricated in accordance with a method previously discussed in conjunction with FIGS. 1 through 5 are regarded as constituent-optical-fiber pre-forms 345 for purposes of fabricating a fused GRIN-fiber bundle 420.

Figure 9A:
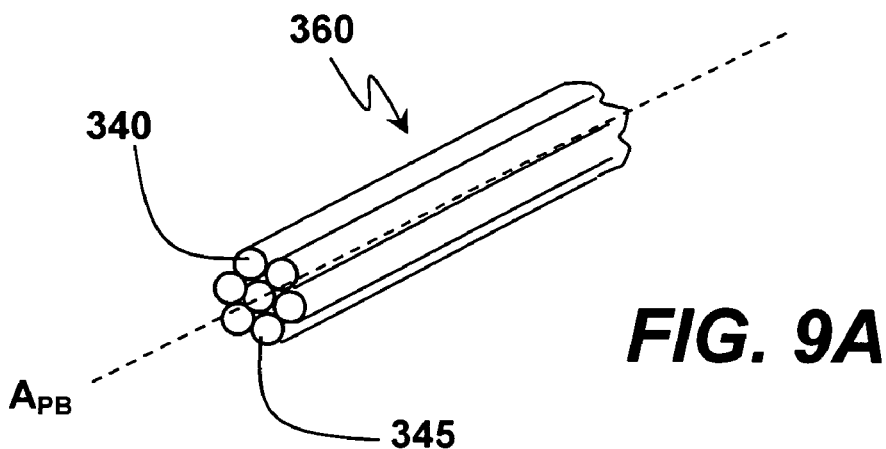
FIG. 9A shows a GRIN-fiber bundle pre-form including at least two types of constituent-optical-fiber pre-forms.

As shown in FIGS. 7 and 9A, at step 730, constituent-optical-fiber pre-forms 340 and/or 345 selected from at least one of the first and second sets of constituent-optical-fiber pre-forms are bundled such that each pre-form 340 and/or 345 extends along a common pre-form bundle axis APB and is in contacting engagement with at least one other pre-form 340 and/or 345 in the pre-form bundle 360. The illustrative pre-form bundle 360 of FIG. 9A includes constituent-optical-fiber pre-forms 340 and 345 from both of the first and second constituent-optical-fiber pre-form sets.

Figure 9B:
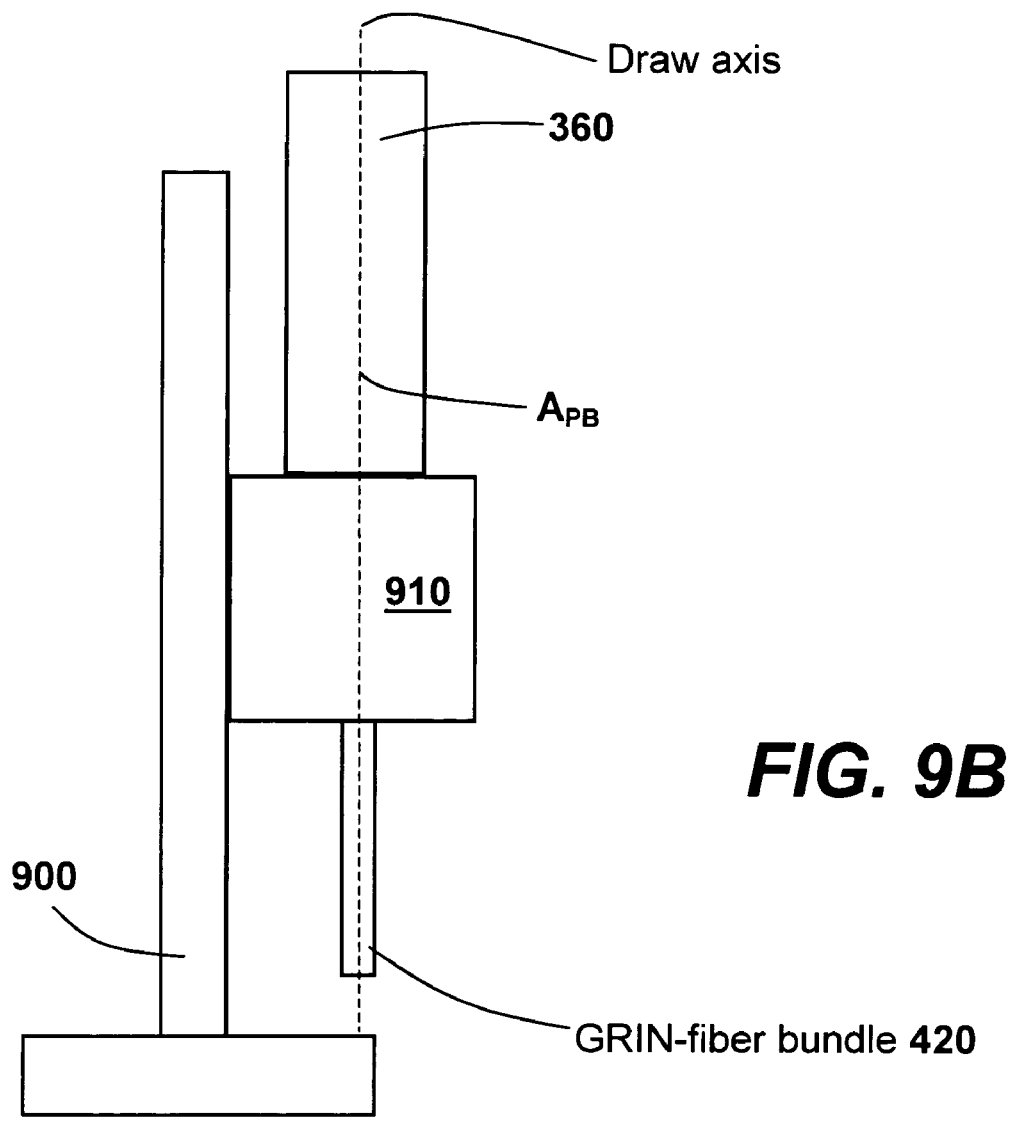
FIG. 9B depicts the heating and drawing of the GRIN-fiber bundle pre-form of FIG. 9A through the furnace of an optical fiber drawing tower to yield a fused GRIN-fiber bundle.

At step 740, the pre-form bundle 360 is introduced vertically into the furnace 910 of an optical fiber drawing tower 900 as shown, for example, in FIG. 9B.

At step 750, the pre-form bundle 360 is heated and vertically drawn such that adjacent constituent-optical-fiber pre-forms 340 and/or 345 fuse together and such that, with respect to each constituent-optical-fiber pre-form 340 or 345 of a selected plurality of constituent-optical-fiber pre-forms 340 and/or 345 in the pre-form bundle 360, a quantity of high-refractive-index ions HII in the core material is diffused radially outwardly and into the cladding material as shown, for example, in FIG. 3 and discussed in association with the fabrication of a single GRIN fiber 350.

The foregoing is considered to be illustrative of the principles of the invention. Furthermore, since modifications and changes to various aspects and implementations will occur to those skilled in the art without departing from the scope and spirit of the invention, it is to be understood that the foregoing does not limit the invention as expressed in the appended claims to the exact construction, implementations and versions shown and described.

What is claimed is:

1. A method of fabricating an optical fiber having a radially graded refractive index profile, the method comprising:

providing an elongated glass core rod fabricated from a first material containing a distribution of high refractive index ions;

providing an elongated glass cladding tube fabricated from a second material containing one of (i) a zero and (ii) a relatively low concentration of the high-refractive-index ions present in the core rod, the cladding tube being adapted to axially receive the core rod;

introducing the core rod into the cladding tube to create a preform having a longitudinal preform axis passing through the center of the core rod;

orienting the preform such that the longitudinal preform axis extends along a vertical axis; and heating and drawing, simultaneously, the preform along the vertically oriented preform axis such that, as a result of the simultaneous heating and drawing, (i) the tube collapses and fuses around the core rod and (ii) a quantity of the high-refractive-index ions in the core rod material is permitted to diffuse radially outwardly with respect to the preform axis and into the cladding material.

2. The method of claim 1 wherein the heating and drawing result in an optical monofiber element having a radially-dependent high-refractive-index-ion density profile in which the fiber axis corresponds to the highest high-refractive-index-ion density and the ion density decreases outwardly in accordance with a non-linear radially dependent function.

3. The method of claim 2 further comprising the step of controlling the heating time and draw rate with the objective of preventing high-refractive-index ions diffusing into the cladding from migrating to the outer boundary of the drawn cladding such that the high-refractive-index-ion density as a function of radius falls to some minimum before the diffusion radius is equal to the drawn-cladding radius.

4. An optical fiber exhibiting a radially graded refractive index profile and fabricated in accordance with the method of claim 1.

5. An optical fiber exhibiting a radially graded refractive index profile and fabricated in accordance with the method of claim 2.

6. An optical fiber exhibiting a radially graded refractive index profile and fabricated in accordance with the method of claim 3.

7. A method of fabricating a fused, image-conducting optical fiber bundle having an image input end, an image emergence end and a plurality of constituent optical fibers, each optical fiber having a first end coinciding with the image input end and a second end coinciding with the image emergence end, wherein each optical fiber of selected set of optical fibers among the plurality has a radially-dependent graded refractive index profile, the fabrication method comprising:

providing a plurality of constituent-optical-fiber pre-forms selected from at least one of:

(a) a first set of constituent-optical-fiber pre-forms each of which pre-forms is fabricated in accordance with a method including (i) providing an elongated glass core rod comprising a first material including a concentration of high-refractive-index ions, (ii) providing an elongated glass cladding tube fabricated from a second material including one of (a) a zero and (b) a relatively low concentration of the high-refractive-index ions present in the core rod (iii) axially introducing the core rod into the cladding tube and (iv) heating and drawing the cladding tube and the core rod such that the cladding tube collapses about the core rod in a manner calculated to obviate the diffusion of high-refractive-index-ions within the core rod and from the core rod into the cladding tube, and (b) a second set of constituent-optical-fiber pre-forms each of which pre-forms is fabricated in accordance with a method including (i) providing an elongated glass core rod comprising a first material including a concentration of high-refractive-index ions, (ii) providing an elongated glass cladding tube fabricated from a second material including one of (a) a zero and (b) a relatively low concentration of the high-refractive-index ions present in the core rod and (iii) heating and drawing the cladding tube and the core rod such that the cladding tube collapses about the core rod and such that radially outward diffusion of high-refractive-index-ions within the core rod and from the core rod into the cladding tube is facilitated thereby yielding a constituent-optical-fiber pre-form exhibiting a radially-dependent graded refractive index;

bundling the selected constituent-optical-fiber pre-forms such that each constituent-optical-fiber pre-form extends along a common pre-form bundle axis and is in contacting engagement with at least one other constituent-optical-fiber pre-form in the pre-form bundle;

introducing the pre-form bundle vertically into a furnace of an optical fiber drawing tower; and heating and vertically drawing, simultaneously, the pre-form bundle such that, as a result of the simultaneous heating and drawing, (i) adjacent constituent-optical-fiber pre-forms fuse together and (ii) with respect to each constituent-optical-fiber pre-form of a selected plurality of constituent-optical-fiber pre-forms in the pre-form bundle, a quantity of high-refractive-index ions in the core material is diffused radially outwardly and into the cladding tube material.

8. A fused GRIN-fiber bundle fabricated in accordance with the method of claim 7.

9. The GRIN-fiber bundle of claim 8 wherein the GRIN-fiber bundle is in the form of at least one of:

a straight through;
an inverter;
a enlarger/reducer;
an inverting enlarger/reducer; and
an image-conducting faceplate.

10. A method of fabricating an optical fiber having a radially graded refractive index profile, the method comprising:

providing an elongated glass core rod fabricated from a first material containing as uniform a distribution of high refractive index ions as practicable;

providing an elongated glass cladding tube fabricated from a second material containing as low a concentration of the high-refractive-index ions present in the core rod as practicable, the cladding tube being adapted to axially receive the core rod;

introducing the core rod into the cladding tube to create a preform having a longitudinal preform axis passing through the center of the core rod;

orienting the preform such that the longitudinal preform axis extends along a vertical axis; and heating and drawing, simultaneously, the preform along the vertically oriented preform axis such that, as a result of the simultaneous heating and drawing, each of (i) the tube collapses and fuses around the core rod and (ii) a quantity of the high-refractive-index ions in the core rod material diffuses radially outwardly with respect to the preform axis and into the cladding material.

11. The method of claim 10 wherein, to the extent that the cladding tube does not contain a zero concentration of the high-refractive-index ions present in the core rod, the cladding tube contains a uniform distribution of the high-refractive-index ions present in the core rod.

12. An optical fiber exhibiting a radially graded refractive index profile and fabricated in accordance with the method of claim 11.

13. An optical fiber exhibiting a radially graded refractive index profile and fabricated in accordance with the method of claim 10.

* * * * *